United States Patent [19]
Maynard, Jr.

[11] Patent Number: 5,460,661
[45] Date of Patent: Oct. 24, 1995

[54] PROCESS FOR BONDING A FLUOROPOLYMER TO A METAL SURFACE

[75] Inventor: William C. Maynard, Jr., Magna, Utah

[73] Assignee: Fisher Company, North Salt Lake, Utah

[21] Appl. No.: 205,889

[22] Filed: Mar. 3, 1994

Related U.S. Application Data

[63] Continuation-in-part of Ser. No. 774,548, Oct. 10, 1991, abandoned.

[51] Int. Cl.⁶ .................... B32B 15/08; C09J 5/06
[52] U.S. Cl. .................. 148/251; 427/195; 427/388.1
[58] Field of Search ................. 148/251; 427/195, 427/388.1

[56] References Cited

U.S. PATENT DOCUMENTS 2,789,926  4/1957  Finholt ...................... 427/195
3,939,027  2/1976  Ohya ....................... 427/388.1

FOREIGN PATENT DOCUMENTS 1317755  12/1989  Japan ....................... 427/195

Primary Examiner—Sam Silverberg
Attorney, Agent, or Firm—J. Winslow Young

[57] ABSTRACT

A novel process for bonding a fluoropolymer to a metal surface, the process including flowing the fluoropolymer on the metal surface at a temperature at or above the transition temperature of the fluoropolymer and then holding the fluoropolymer at a temperature incrementally above the melting temperature of the fluoropolymer. The holding period allows the chlorine or fluorine in the chloro-fluoropolymer subunits of the fluoropolymer to react with the metal and thereby securely bond the fluoropolymer to the metal surface.

18 Claims, 2 Drawing Sheets

1

PROCESS FOR BONDING A FLUOROPOLYMER TO A METAL SURFACE

This patent application is a continuation-in-part application of my patent application Ser. No. 07/774,548 filed Oct. 10, 1991 now abandoned for NOVEL FLUOROPOLYMER COATING PROCESS.

BACKGROUND

1. Field of the Invention

This invention relates to coating a metal substrate with a fluoropolymer and, more particularly, to a novel process for chemically bonding the fluoropolymer to the metal substrate. Related Applications

The Prior Art

The remarkable discovery that polyethylene could be polymerized with fluorine to produce a fluorinated polyethylene has resulted in the development of numerous types of fluoropolymers. The principal characteristic of a fluoropolymer is its outstanding stability and resistance to chemical attack. Thermoplastic fluoropolymers can be extruded, injection molded, blow molded, rotomolded and applied by fluidized bed or electrostatic coating techniques. They are also available in a wide range of viscosities and grades tailored to specific applications. One representative fluoropolymer is a polyvinylidene fluoride, the homopolymer of 1, 1-difluoroethene. This fluoropolymer is a thermoplastic that is not only tough but also offers a unique balance of properties including the characteristic stability of fluoropolymers when exposed to harsh thermal, chemical, and ultraviolet environments. It also has a unique polarity resulting from the alternating $CH_2$ and $CF_2$ groups along the polymer chain which influences its solubility and electrical properties.

Another representative fluoropolymer is a copolymer of ethylene and chlorotrifluoroethylene which has been shown to offer excellent chemical and abrasion resistance, extremely low permeability, good electrical properties, and a broad range of useful temperature from cryogenic to 300° F. (149° C.). This fluoropolymer is also tough and offers excellent chemical resistance to a wide variety of corrosive chemicals and organic solvents, as well as strong acids, chlorine, and aqueous caustic. No known solvent dissolves or stress cracks this fluoropolymer at temperatures below 250° F. (120° C.).

However, the very features that provide these unique characteristics to fluoropolymers also significantly affect its ability to be bonded to a metal substrate. In particular, in order to bond a fluoropolymer to a metal surface great care must be taken in the preparation of the surface. This is the most important step in obtaining good adhesion. Initially, the surface is sandblasted or otherwise chemically prepared in order to provide what is referred to in the art as "tooth" for the fluoropolymer. Simply stated, "tooth" is the description of a surface that has formed thereon numerous microscopic protrusions, pits, fissures, projections, and the like (such as equivalent to NACE No. 1 for white metal finish), into and around which the fluoropolymer can be mechanically engaged.

After having been carefully prepared, the "tooth" surface is kept thoroughly clean and any residual oil or solvent is removed by prebaking the metal at 550°–600° F. (288°–316° C.). The metal should then be coated with the fluoropolymer as soon as practicable in order to minimize oxidation of the metal since the oxidation products may interfere with the mechanical bonding between the fluoropolymer and the metal. Conventionally, a fluoropolymer primer is sprayed as a powder and baked at 620°–550° F. (327°–288° C.) for at least 10 minutes to ensure that it flows into the micro cracks and fissures on the surface.

Another prior art technique for improving the bonding of a fluoropolymer to a substrate involves maximizing the rate of recrystallization of the fluoropolymer at the boundary surface in order to prevent internal stresses in the fluoropolymer from being concentrated at the boundary surface. This technique is taught by Ohya et al (U.S. Pat. No. 3,939,027) and includes heating the fluoropolymer and the substrate to a temperature above the melting point of the fluoropolymer. The two are then brought together with the fluoropolymer in the melted state and held at that temperature long enough to wet the boundary surface. The boundary surface is then cooled to a second temperature below the melting temperature, the second temperature being the temperature at which the rate of crystallization of the fluoropolymer is maximized. The temperature of maximum recrystallization rate is defined by the general equation [(melting point °C.+273)×9/10–273]. This means that the recrystallization always occurs below the melting temperature.

From the foregoing it is obvious that the strength of the bond between the fluoropolymer and the metal substrate is a function of either or both the mechanical interlocking of the fluoropolymer with the metal substrate and the controlled rate of recrystallization of the fluoropolymer. Clearly, therefore, it would be a significant advancement in the art to provide a novel process for tightly bonding a fluoropolymer to a metal substrate. It would also be an advancement in the art to provide a process for chemically bonding a fluoropolymer to a metal surface, even a metal surface which has not been mechanically or chemically pretreated to produce surface roughness. An even further advancement in the art would be to provide a novel bonding process for bonding a fluoropolymer to a metal substrate without the necessity for controlling the recrystallization rate of the fluoropolymer. Such a novel process is disclosed and claimed herein.

BRIEF SUMMARY AND OBJECTS OF THE INVENTION

This invention involves the novel discovery that a fluoropolymer can be tightly bonded to a metal substrate by what is believed to be the chemical bonding of the fluorine and/or chlorine subunits in the fluoropolymer with the metal on the surface of the metal substrate. The process involves applying a fluoropolymer to the metal substrate as a powder and then heating the fluoropolymer above its transition temperature to cause it to flow out and thereby form a unitary coating. The fluoropolymer-coated metal substrate is then held at a temperature above the melting temperature but incrementally below the transition temperature for a sufficient length of time to allow the halogen (the fluorine or chlorine from the halogen-polymer subunits in the fluoropolymer) to chemically bond to the metal substrate. Successive coats of the fluoropolymer can also be applied to increase the total thickness of the fluoropolymer coating with each coating step being selectively followed by a holding period to further enhance the bonding of the fluoropolymer to the metal substrate.

It is, therefore, a primary object of this invention to provide improvements in the process for bonding a fluoropolymer to a metal substrate.

Another object of this invention is to provide a process for chemically bonding a fluoropolymer to a metal substrate.

Another object of this invention is to provide a process for chemically bonding a fluoropolymer to a metal substrate by interacting fluorine and/or chlorine from the fluorine/chlorine subunits in the fluoropolymer with the metal surface of the metal substrate.

Another object of this invention is to provide a process for bonding a fluoropolymer to a metal substrate whereby one or more coatings of fluoropolymer are held for a predetermined period of time at a holding temperature above the melting temperature and at or incrementally below the transition temperature of the fluoropolymer to thereby allow the halogen subunits of the fluoropolymer to react with the metal surface of the metal substrate and thereby chemically bond the fluoropolymer to the metal substrate.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
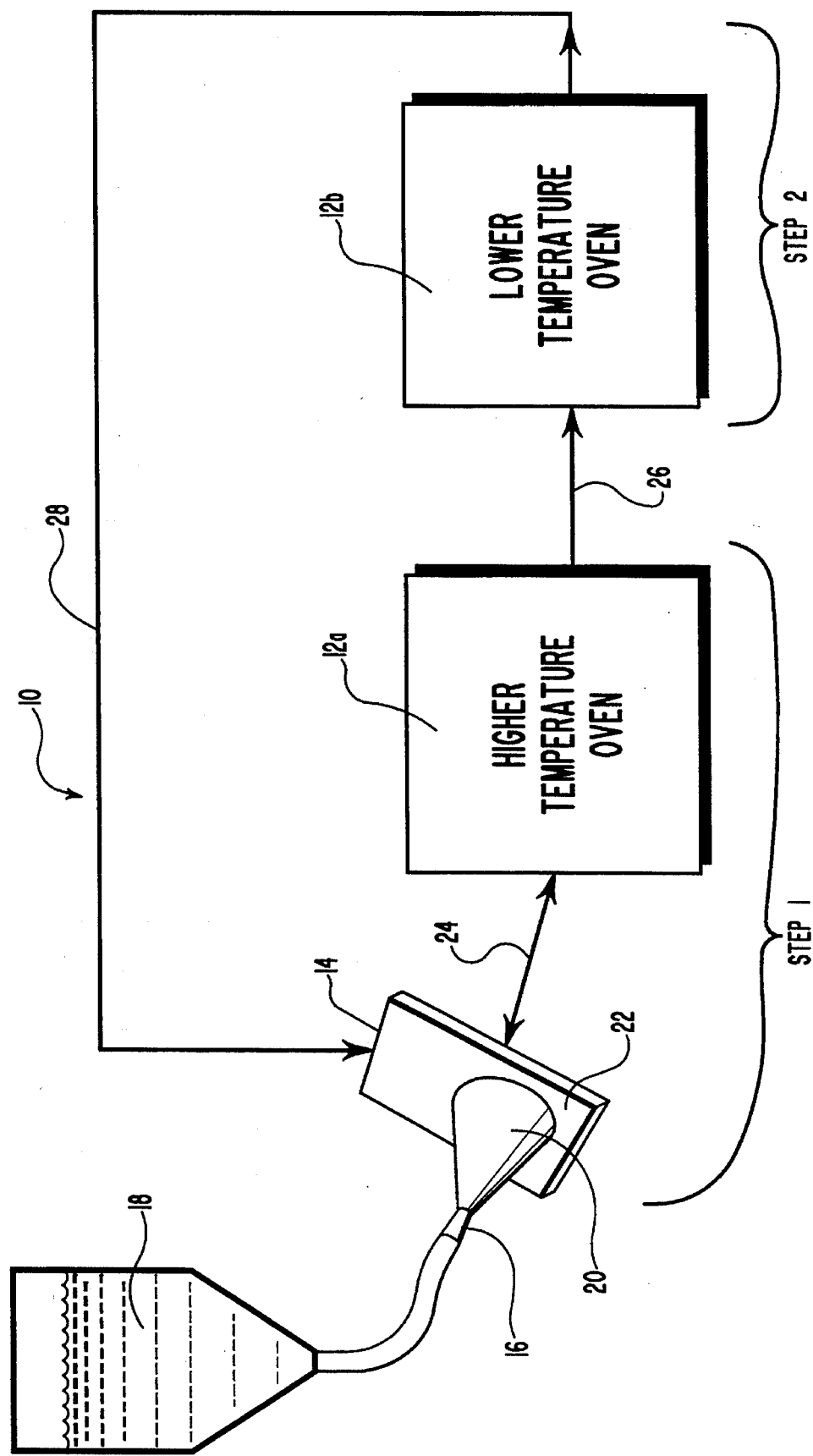
FIG. 1 is a schematic flow diagram of one preferred embodiment of the novel process of this invention.

The invention is best understood by reference to the following description and the appended claims taken in conjunction with the accompanying drawing wherein like parts are indicated by like numerals throughout.

General Discussion

As a fluoropolymer, particularly the powdered form of the fluoropolymer, is heated it first reaches its melting point; and, upon further heating, reaches its transition temperature. The transition temperature is that temperature at which the melted fluoropolymer flows together or otherwise transitions from a molten, nonagglomerated state to a continuous, molten state. In effect, at its transition temperature the molten fluoropolymer will readily flow thereby forming an essentially void-free coating.

The novel process of this invention involves holding the molten fluoropolymer at a temperature incrementally below this transition temperature but above the melting temperature for a sufficient length of time in order to obtain the desired reaction between the halogen subunits and the metal surface. The fluoropolymer is held below its transition temperature in order to preclude runoff of the fluoropolymer or other unacceptable changes in the physical parameters of the coating. Holding the fluoropolymer above its melting temperature allows the halogen subunits therein to migrate to the surface of the metal substrate and there react with the metal. Holding the fluoropolymer below its transition temperature also reduces the tendency for the fluoropolymer to flow thereby altering the integrity of the physical dimensions of the coating.

This invention was discovered upon observation of an unusual phenomena that occurred as a result of an interruption of a routine preparation of a fluoropolymer sheet for testing purposes. The sheets of fluoropolymer were being prepared from an unprimed powder in order to investigate why there were spots or blemishes in the fluoropolymer sheet. Test sheets of fluoropolymer were being produced by spraying unprimed fluoropolymer powder on a flexible sheet of polished, stainless steel. The fluoropolymer sheets were prepared from a plurality of coats of fluoropolymer. Each coat was successively applied as a layer of sprayed powder and then melted and flowed out to produce a uniform surface. Each successive coat of fluoropolymer was heated above its transition temperature in an oven to achieve a clear melt that flowed out to form each successive layer of the sheet. After a sufficient thickness of fluoropolymer had been thus obtained, the sheet of stainless steel with its sheet of fluoropolymer was removed from the oven and cooled. The edges of the fluoropolymer sheet were trimmed to allow the fluoropolymer to be peeled from the stainless steel sheet. Customarily, an extremely poor bond is formed with the polished stainless steel so that it was only necessary to flex the stainless steel sheet to release the sheet of fluoropolymer from the stainless steel.

However, while conducting one run, I took a scheduled break during the period of time the test strip was in the oven. To preclude fluoropolymer from running off the metal strip, I lowered the temperature to a point incrementally below the transition temperature of the fluoropolymer but above its melting temperature. Upon returning from the scheduled break, the temperature of the oven was again raised and additional coats of fluoropolymer were applied according to the scheduled procedure. Upon attempting to remove the resultant fluoropolymer sheet from the polished stainless steel sheet I discovered that the fluoropolymer would not release. Even the use of pliers, a knife, and a chisel would not cause the separation of the fluoropolymer from the polished stainless steel. This extraordinary event caused me to reevaluate the entire procedure with the conclusion that it was the specific temperature range and the holding period as reflected by my scheduled break that caused the unexpected results to occur. In particular, I have concluded that holding the previously melted fluoropolymer at a temperature above the melting temperature but incrementally below the transition temperature of the fluoropolymer allows unreacted or free chlorine and/or fluorine-polymer subunits in the fluoropolymer to chemically react with the metal so as to create a metal-fluoropolymer bond with the chlorine or fluorine-polymer subunits serving as the bonding unit between the two surfaces.

Conventionally, great care is taken in the manufacture of fluoropolymers to reduce or eliminate, to the extent possible, these chlorine or fluorine-polymer subunits. A basic patent in this field is that of Khattab, U.S. Pat. No. 3,773,698 for STABILIZED MELT-PROCESSABLE ETHYLENE/ CHLOROTRIFLUOROETHYLENE COPOLYMER COMPOSITIONS. This patent teaches the stabilization of ethylene/chlorotrifluoroethylene copolymer compositions against thermal degradation so as to render them melt processable by incorporating a four-component stabilizing system. The system includes a phosphite of an organic polyhydric phenol, a salt of a carboxylic acid and a metal of Group II of the Periodic Table, a thio dipropionic acid ester or alkali metal salt, and an alkaline earth metal oxide. It has been found that thermal degradation of ethylene/chlorotrifluoroethylene copolymers involves release of acidic gasses, presumably the acidic gases of chlorine and fluorine present in unreacted copolymer subunits of the chlorine and fluorine. The stabilizer system apparently scavenges these acidic gases to preclude their interfering with the melt processing of the fluoropolymer.

However, regardless of the extent to which attempts are made to eliminate these halogen subunits from the fluoropolymer, some will always be present and available for use in bonding the fluoropolymer to a metal substrate according to the teachings of my invention. Preferably, a suitable number of halogen subunits will always be available for bonding purposes for the practice of this invention.

DETAILED DESCRIPTION

Referring now to FIG. 1, the novel process of this invention is shown as a schematic flow diagram at 10 and includes a higher temperature oven 12a, a lower temperature oven 12b, a metal substrate 14, and a spray applicator 16 for applying a fluoropolymer powder 18 as a spray 20 to metal substrate 14 to produce a fluoropolymer coating 22. Each increment of fluoropolymer coating 22 is placed in higher temperature oven 12a where fluoropolymer powder 18 is not only melted but also heated above its transition temperature to cause fluoropolymer powder 18 to melt and then flow out into the continuous coating of fluoropolymer coating 22. Successive coats of fluoropolymer coating 22 can be applied to metal substrate 14 upon removal of metal substrate 14 from higher temperature oven 12a followed by the application of another layer of fluoropolymer powder 18 which is then reinserted into higher temperature oven 12a. The placement and removal of metal substrate 14 relative to higher temperature oven 12a is illustrated schematically by double arrow 24.

After a predetermined thickness of fluoropolymer coating 22 has been formed, metal substrate 14 is removed from higher temperature oven 12a and introduced into lower temperature oven 12b as indicated schematically by arrow 26. Clearly, of course, higher temperature oven 12a and lower temperature oven 12b can be the same oven operated at the two, different temperatures to practice the novel process of this invention. However, for ease of discussion herein each temperature oven is shown as a separate oven to more clearly set forth the fact that fluoropolymer coating 22 is subjected to a holding period in lower temperature oven 12b after having been subjected to flow out above its transition temperature in higher temperature oven 12a. The temperature of lower temperature oven 12b is above the melting temperature but incrementally below the transition temperature for fluoropolymer coating 22.

After completion of the stalling period in lower temperature oven 12b metal substrate 14 may be returned to the starting point as indicated by arrow 28 where subsequent layers of fluoropolymer powder 18 are sprayed thereon (spray 20) to increase the thickness of fluoropolymer coating 22. Fluoropolymer coating 22 can be subjected to additional holding periods in lower temperature oven 12b as determined by the nature of the fluoropolymer, its ultimate thickness, and the type of metal of metal substrate 14. Importantly, fluoropolymer coating 22 is subjected to at least one holding period in lower temperature oven 12b.

The application of spray 20 and the processing through melting and flow out of fluoropolymer coating 22 in higher temperature oven 12a is shown generally as consisting of Step 1 while the holding period in lower temperature oven 12b is shown as Step 2. Step 1 may include the sequential application of a plurality of coats of fluoropolymer coating 22, each of which is followed by introduction into higher temperature oven 12a and then removal therefrom as indicated by arrow 24.

The holding period in lower temperature oven 12b follows the flow out of fluoropolymer coating 22 in higher temperature oven 12a since the temperature in lower temperature oven 12b is incrementally lower than the transition temperature of fluoropolymer 18. However, to a limited degree, one could process fluoropolymer coating 22 at a holding temperature incrementally above the transition temperature of the fluoropolymer 18 although great care must be taken to preclude fluoropolymer coating 22 from excessively flowing relative to metal substrate 14 to the detriment of fluoropolymer coating 22 which would otherwise render fluoropolymer coating 22 useless since uniformity of fluoropolymer coating 22 is generally considered to be an essential feature of fluoropolymer coating 22.

Metal substrate 14 is shown herein as a flat sheet of metal for ease of illustration. However, it is to be clearly understood that metal substrate 14 can represent any item of metal fabricated in any predetermined shape. Clearly, of course, different sizes and shapes for metal substrate 14 will dictate different application techniques for spray 20 in addition to the temperatures and time periods that metal substrate 14 is processed in higher temperature oven 12a and lower temperature oven 12b.

The following example sets forth the novel process of this invention. Example is to be considered as illustrative only of the novel process of this invention and not restrictive of the scope of the claims therefore.

EXAMPLE 1

This experimental run was conducted to confirm the accidental discovery outlined hereinbefore. A metal substrate in the form of a strip of polished, stainless steel was placed in a heated oven at 565° F. (296° C.) and held there for 45 minutes to assure adequate degassing of the metal. The metal substrate was then removed from the oven and sprayed with a first powder coat of clear fluoropolymer. The fluoropolymer selected for this procedure was a clear, stabilized fluoropolymer commercially available as Halar 6014 from Ausimont, Morristown, N.J. 07962-1838.

The spray-coated metal substrate was returned to the oven, the temperature of which had become lower, 500° F. (260° C.), as a result of the door having been opened. The temperature was then raised to 520° F. (271° C.) and held for two minutes to melt and flow out the fluoropolymer. The coated metal was then removed and a second coat of the fluoropolymer was applied as a powder spray to the metal. After the application of a third coat the temperature of the oven was lowered to 450° F. (232° C.) and the coated metal substrate was held in the oven for several minutes. This holding period involves the fluoropolymer being held at a temperature above its melting temperature and incrementally below its transition temperature. The total time from start of cool down until the oven was again up to temperature was 24 minutes, eleven of which were at the holding temperature. The remaining minutes were taken in the cool down and warm up periods.

Two additional coats of fluoropolymer were applied after which the sample was again subjected to holding at 450° F. (232° C.) for about 16 minutes. A final coat was then applied and allowed to flow out (above its transition temperature) at 520° F. (260° C.) prior to the sample being removed for testing.

The times, temperatures, and process steps are outlined below in Table 1.

TABLE 1

Process Steps as a Function of Time and Temperature

| Process Step | Time (minutes) | Temperature (°C.) |
| --- | --- | --- |
| Metal Degassing | 45 | 296 |
| Spray Coat #1 | 3 | Out of Oven |
| Flow Out #1 | 3 | 271 |
| Spray Coat #2 | 4 | Out of Oven |
| Flow Out #2 | 5 | 271 |
| Spray Coat #3 | 2 | Out of Oven |
| Oven Cool Down | 9 | 257 -> 232 |
| Holding Period #1 | 11 | 232 |
| Oven Heating | 4 | 232 -> 296 |
| Flow Out #3 | 8 | 296 |
| Spray Coat #4 | 2 | Out of Oven |
| Flow Out #4 | 9 | 296 |
| Spray Coat #5 | 2 | Out of Oven |
| Oven Cool Down | 7 | 257 -> 232 |
| Holding Period #2 | 16 | 232 |
| Oven Heating | 2 | 232 -> 296 |
| Flow Out #5 | 5 | 296 |
| Spray Coat #6 | 1 | Out of Oven |
| Flow Out #6 | 9 | 296 |

The oven temperature at the start of the oven cool down period is lower due to opening the oven to insert the sample.

Additional test runs were conducted following the same basic procedure wherein one or more coats of fluoropolymer were applied to a metal substrate. The fluoropolymer was allowed to flow out giving complete coverage to the metal substrate in the oven after each application. Importantly, the molten fluoropolymer was subjected to a subsequent holding period wherein the temperature of the holding oven was held at a point incrementally below the transition temperature of the fluoropolymer. This holding period allowed the chlorine or fluorine in the chloro-fluoro-polymer subunits to react with the metal thereby chemically bonding the fluoropolymer to the metal substrate.

The term "fluoropolymer" is used herein in the generic sense to indicate various types of suitable fluorinated and/or fluorochlorinated hydrocarbons. Table II, below, sets forth representative fluoropolymers and their material properties. The resistance to heat temperature is that temperature at which the fluoropolymer will safely function over an extended period of time without exhibiting significant thermal degradation. The transition temperature is the temperature at which the fluoropolymer starts to flow out and otherwise starts to become liquid. Clearly, of course, thermal degradation becomes much more rapid as the temperature is increased significantly beyond the transition temperature.

The bonding or holding temperature is incrementally below the transition temperature of the fluoropolymer but incrementally above the melt temperature. The principle concept behind the holding temperature is to allow the halogen in the subunits (chlorine and/or fluorine) to react with the metal substrate while keeping the fluoropolymer coating in place on the metal substrate. This bonding reaction occurs more rapidly at the higher temperatures near the transition temperature and is essentially nonexistent at the resistance to heat temperature.

TABLE II

Fluoropolymer Material Properties

| Fluoropolymer | Trade Name | Resistance to heat | | Melt Temperature DIN 53736 | |
| --- | --- | --- | --- | --- | --- |
| | | (°F.) | (°C.) | (°F.) | (°C.) |
| ETFE | TEFZEL(R) | 360 | 182 | 518 | 270 |
| ECTFE | HALAR(R) | 320 | 160 | 464 | 240 |
| CTFE | KEL F(R) | 302 | 150 | 417 | 214 |
| PVDF | SOLEF(R) | 302 | 150 | 352 | 178 |
| PVDF | KYNAR(R) | 272 | 133 | 322 | 161 |
| FEP | TEFLON(R) | 401 | 205 | 527 | 275 |
| PFA | TEFLON(R) | 500 | 260 | 581 | 305 |

ETFE represents ethylenetrifluoroethylene and TEFZEL® is the registered trademark of E. I. Du Pont de Nemours and Company, Inc., Wilmington, Del.

ECTFE represents ethylene chlorotrifluoroethylene and HALAR® is the registered trademark of Ausimont, Inc., Morristown, N.J.

CTFE represents chlorotrifluoroethylene and KEL F® is the registered trademark of Minnesota Mining and Manufacturing Company DBA 3M, Saint Paul, Minn.

PVDF represents polyvinylidine fluoride and SOLEF® is the registered trademark of Solvay America, Inc., Houston, Tex., while KYNAR® is the registered trademark of ATOCHEM, Inc., Glen Rock, N.J.

FEP represents fluorinated ethylene propylene and PFA represents perfluorylalkoxy while TEFLON® is the registered trademark of E. I. Du Pont de Nemours and Company, Inc., Wilmington, Del.

The coating process of Step 1 and Step 2 (FIG. 1) set forth hereinbefore is followed for each of the fluoropolymers identified in Table II, above. The temperature of higher temperature oven 12a is, of course, suitably adjusted to accommodate the particular fluoropolymer so as to accomplish the desired degree of flow out of the fluoropolymer. Similarly the holding temperature of lower temperature oven 12b is also selectively adjusted so as to achieve the novel bonding process of this invention. The holding temperature will, of course, determine the length of time fluoropolymer coating 22 is held in lower temperature oven 12b. In particular, a higher temperature (near the transition temperature) will mean that a shorter time period is required to achieve the desired degree of bonding between fluoropolymer coating 22 and metal substrate 14. Correspondingly, the same degree of bonding will require a substantially longer holding period at a lower holding temperature.

Not only does the novel process of this invention produce an excellent bond between fluoropolymer coating 22 and metal substrate 14, but it also has the distinct advantage of bonding in the absence of a primer. Most primers consist of a fluoropolymer with a pigment such as titanium dioxide and are applied as an undercoat in order to provide a pleasing appearance to the subsequent fluoropolymer coating. However, I have found that the primer is not only unnecessary but could interfere with the bonding process probably due to the pigment in the primer scavenging the chlorine/fluorine subunits essential to the bonding process. The absence of a primer coat is a distinct advantage since many primers are quite expensive and do not contribute to the characteristics of the fluoropolymer coating for which the coating is being applied.

Figure 2:
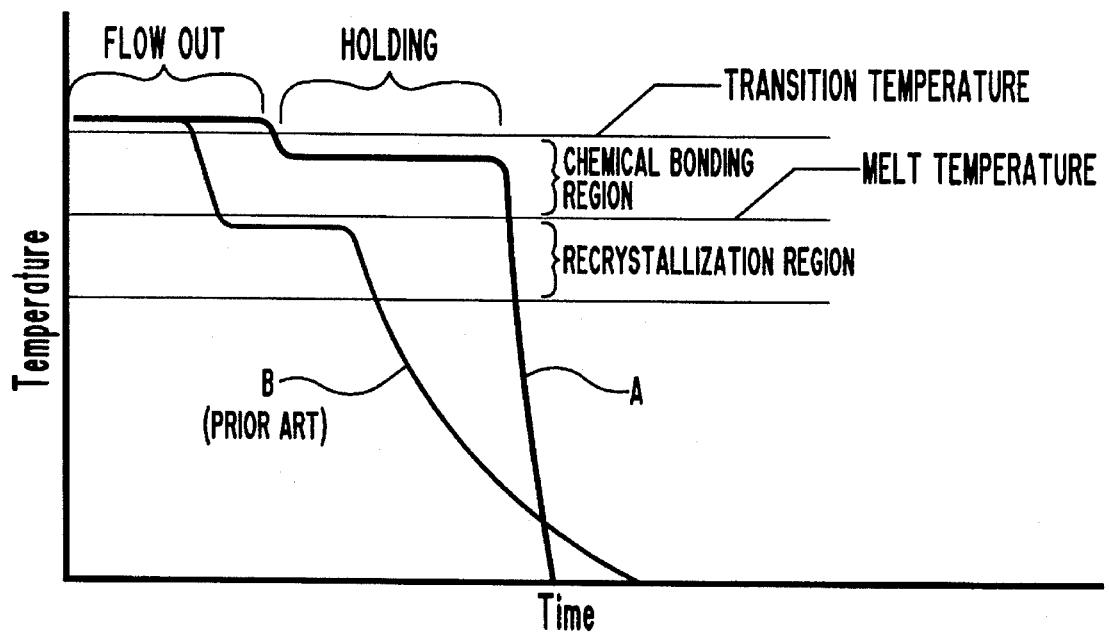
FIG. 2 is a schematic graph of temperature versus time for the novel process of this invention along with two prior art processes.

Referring now to FIG. 2, the novel process of this invention is shown on a graph of temperature versus time required to achieve the novel bonding process of this invention. The temperature scale includes an upper line that represents the transition or flow out temperature for the particular fluoropolymer. The next line below the transition temperature is the melt temperature and the space between these lines is designated as the chemical bonding region. The second region below the melt temperature is the recrystallization region defined by Ohya et al (U.S. Pat. No. 3,939,027) and is included herein to clearly distinguish the present, novel bonding process of this invention over the recrystallization process of this prior art reference.

The novel bonding process is schematically shown herein as line A which represents the passage of fluoropolymer coating 22 (FIG. 1) from the flow out phase above the transition temperature) into the holding period in the chemical bonding region. The flow out phase is incrementally above the transition temperature while the chemical bonding range is incrementally below the transition temperature and above the melting temperature. This chemical bonding region allows the halogen subunits in the fluoropolymer to react with the metal of the metal substrate to produce a very strong bond between the fluoropolymer and the metal substrate.

The prior art process of Ohya et al is shown schematically by line B in that the fluoropolymer is held in the recrystallization region at a temperature incrementally below the melt temperature of the fluoropolymer. The process of Ohya et al provides for the gradual formation of the crystallization structure of the fluoropolymer and does not result in chemical bonding of the fluoropolymer to a metal substrate. This latter fact is readily apparent since the Ohya et al reference teaches the coating of various metallic and nonmetallic substrates with the fluoropolymer coating.

Another distinction between the present invention and the prior art reference of Ohya et al is that the present invention, as illustrated by line A, can be subjected to rapid cooling at the end of the holding period with no deleterious affect on the quality of the bond of fluoropolymer coating 22 with metal substrate 14. In one test metal substrate 14 and its bonded fluoropolymer coating 22 were plunged into ice water with no detectable diminution of the strength of the bond.

Figure 3:
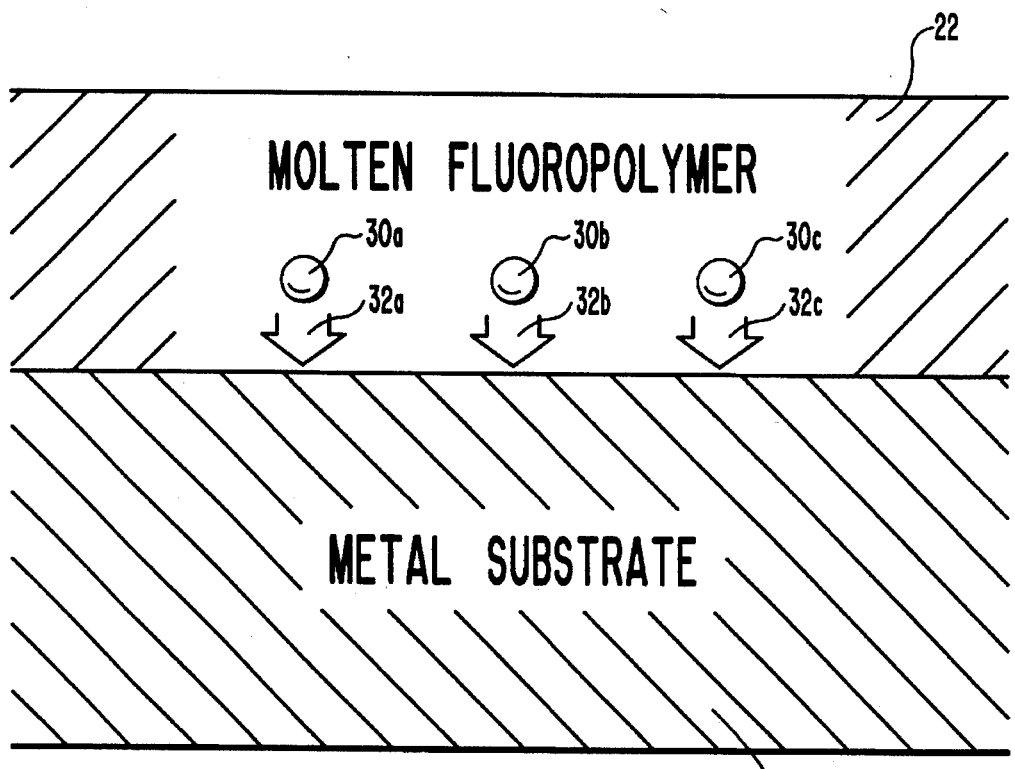
FIG. 3 is an enlarged, cross-sectional schematic of the novel chemical bonding process of this invention.

Referring now to FIG. 3, a plurality of halogen subunits are shown schematically herein at 30a–30c in the body of fluoropolymer coating 22 in this schematic illustration of the novel process of this invention. In particular, fluoropolymer coating 22 is subjected to a holding period at a temperature incrementally below the transition temperature and above the melting temperature so as to enable halogen subunits 30a–30c to migrate, as shown schematically by arrows 32a–32c respectively, to the surface of metal substrate 14. Halogen subunits 30a–30c then react with the metal surface of metal substrate 14 to produce the chemical bonding of fluoropolymer coating 22 to metal substrate 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process for bonding a fluoropolymer to a metal surface comprising:

preparing said metal surface;

applying at least a first layer of said fluoropolymer to said metal surface;

flowing said fluoropolymer on said metal surface by heating said fluoropolymer to a first temperature comprising the transition temperature for said fluoropolymer;

lowering the temperature of said fluoropolymer from said first temperature to a second temperature, said second temperature comprising a bonding temperature incrementally above the melting temperature of said fluoropolymer;

holding said fluoropolymer at said second temperature for a first predetermined period of time sufficient to cause a reaction between at least some of the halogen subunits in said fluoropolymer and the metal of said metal surface;

bonding said fluoropolymer to said metal surface with said reaction between said halogen subunits and said metal; and cooling said fluoropolymer.

2. The process defined in claim 1 wherein said applying step comprises forming said first coat from one or more applications of said fluoropolymer.

3. The process defined in claim 1 wherein said heating step comprises heating said fluoropolymer to said first temperature, said first temperature comprising said transition temperature thereby causing said fluoropolymer to flow into said first layer.

4. The process defined in claim 1 wherein said heating step comprises heating said fluoropolymer to said first temperature within the range on the order of about said transition temperature of said fluoropolymer to the degradation temperature of said fluoropolymer.

5. The process defined in claim 1 wherein said bonding step comprises holding said fluoropolymer at said second temperature which is incrementally below said first temperature and incrementally above said melting temperature.

6. The process defined in claim 1 wherein said bonding step comprises holding said fluoropolymer for said predetermined time within the range on the order of about five minutes to sixty minutes.

7. The process defined in claim 1 wherein said bonding step includes applying at least a second layer of said fluoropolymer to said first layer and heating said second layer of said fluoropolymer at said first temperature causing said second layer to flow out followed by holding said second layer at said second temperature for a second, predetermined period of time.

8. A process for bonding a fluoropolymer coating to a metal surface comprising:

preparing said metal surface to receive said fluoropolymer coating;

forming a first layer of said fluoropolymer on said metal surface;

heating said fluoropolymer layer on said metal surface to the transition temperature of said fluoropolymer thereby causing said fluoropolymer to flow into said fluoropolymer coating; and bonding said fluoropolymer coating to said metal surface by holding said fluoropolymer coating at a bonding temperature operable to allow halogen subunits in said fluoropolymer coating to react with said metal surface, said bonding temperature comprising a temperature incrementally above the melt temperature of said fluoropolymer.

9. The process defined in claim 8 wherein said heating step comprises heating said fluoropolymer layer on said metal surface to the transition temperature of said fluoropolymer thereby causing said fluoropolymer to flow into said fluoropolymer coating.

10. The process defined in claim 8 wherein said bonding step comprises holding said fluoropolymer coating at said bonding temperature for a period of time within the range on the order of about five minutes to sixty minutes.

11. The process defined in claim 8 wherein said bonding step includes selecting said bonding temperature within the range on the order of about incrementally above said melting temperature to the decomposition temperature of said fluoropolymer.

12. The process defined in claim 8 wherein said bonding step includes selectively repeating said forming step and said bonding step thereby adding at least a second coat of said fluoropolymer to said fluoropolymer coating.

13. The process defined in claim 12 wherein said adding step includes holding said second coat at said bonding temperature.

14. The process defined in claim 8 wherein said forming step includes applying a plurality of layers of said fluoropolymer coating to said metal substrate.

15. A process for bonding a fluoropolymer to a metal substrate comprising:

selecting a fluoropolymer having unreacted fluorine and/or fluorine/chlorine subunits present in said fluoropolymer;

applying said fluoropolymer to said metal substrate;

flowing said fluoropolymer on said metal substrate by heating said fluoropolymer on said metal substrate to a first temperature incrementally above the transition temperature of said fluoropolymer;

cooling said fluoropolymer and said metal substrate to a second temperature incrementally below said transition temperature and incrementally above the melting temperature of said fluoropolymer;

holding said fluoropolymer and said metal substrate at said second temperature for a preselected period of time; and bonding said fluoropolymer to said metal substrate by reacting said unreacted fluorine and/or fluorine/chlorine subunits with said metal substrate while holding said fluoropolymer and said metal substrate at said second temperature.

16. The process defined in claim 15 wherein said applying step comprises spraying said fluoropolymer as a powder on said metal substrate.

17. The process defined in claim 15 wherein applying step and said heating step are repeated a plurality of times thereby building a coating of said fluoropolymer on said metal substrate.

18. The process defined in claim 17 wherein said building step is followed by said bonding step.

\* \* \* \* \*